(12) United States Patent
Wang et al.

(10) Patent No.: US 12,388,357 B2
(45) Date of Patent: Aug. 12, 2025

(54) APFC CONTROL CIRCUIT, METHOD, AND SYSTEM

(71) Applicant: Wuhan Megmeet Electrical Co., Ltd

(72) Inventors: Zhong Wang, Wuhan (CN); Qiong Wu, Wuhan (CN); Bo Tang, Wuhan (CN)

(73) Assignee: Wuhan Megmeet Electrical Co., Ltd, Wuhan (CN)

( * ) Notice: Subject to any disclaimer, the term of this patent is extended or adjusted under 35 U.S.C. 154(b) by 300 days.

(21) Appl. No.: 18/218,018

(22) Filed: Jul. 4, 2023

(65) Prior Publication Data

US 2024/0195292 A1 Jun. 13, 2024

(30) Foreign Application Priority Data

Dec. 7, 2022 (CN) .......................... 202211565878.0

(51) Int. Cl.
*H02M 1/42* (2007.01)
*H02M 1/12* (2006.01)

(52) U.S. Cl.
CPC ......... *H02M 1/4225* (2013.01); *H02M 1/126* (2013.01)

(58) Field of Classification Search
CPC ............................ H02M 1/126; H02M 1/4225
See application file for complete search history.

(56) References Cited

U.S. PATENT DOCUMENTS

| 7,449,869 | B2* | 11/2008 | Markowski | ........... | H02M 3/157 |
| | | | | | 323/283 |
| 8,130,522 | B2* | 3/2012 | Maksimovic | ....... | H02M 3/1584 |
| | | | | | 323/283 |
| 10,778,088 | B2* | 9/2020 | Lim | .................... | H02M 1/4208 |

(Continued)

FOREIGN PATENT DOCUMENTS

| CN | 106655752 A | 5/2017 |
| CN | 112366965 A | 2/2021 |

(Continued)

OTHER PUBLICATIONS

Changjiang Information and Communication, Issue 01, 2021; Jan. 15, 2021; Zheng Rongshun et al., "Research and Application of Synchronous Signals Based on Phase Deviation Compensation"; pp. 116-119; 1-2,4-10.

(Continued)

*Primary Examiner* — Gary A Nash (57) ABSTRACT

The present disclosure provides an active power factor correction (APFC) control circuit, a method, and a system. The control circuit is configured to control turning-on and turning-off of a main switch tube of a boost module in an APFC converter circuit. The APFC control circuit includes a sampling correction module, a zero-pole compensation module, a first control module, a data processing module, and a second control module; the sampling correction module is for sampling and correcting a utility voltage, and an inductor current and a bus voltage; the zero-pole compensation module is for zero-pole compensation of the sampled (Continued)

utility voltage, inductor current, and bus voltage; the first control module is for outputting a voltage adjustment coefficient; the data processing module is for obtaining a reference current; the second control module is for outputting a target control signal to the main switch tube.

20 Claims, 7 Drawing Sheets

(56) References Cited

U.S. PATENT DOCUMENTS

| | | | |
|---|---|---|---|
| 2018/0278150 A1* | 9/2018 | Zhao | H02M 1/4225 |
| 2019/0097528 A1* | 3/2019 | Wang | H02M 1/12 |
| 2020/0059151 A1* | 2/2020 | Oh | H02M 1/126 |
| 2020/0328668 A1* | 10/2020 | Li | H02M 1/14 |

FOREIGN PATENT DOCUMENTS

| | | |
|---|---|---|
| CN | 113422550 A | 9/2021 |
| KR | 1020070030405 A | 3/2007 |

OTHER PUBLICATIONS

Chinese First Office Action, Chinese Application No. 202211565878.0, mailed Nov. 8, 2023 (18 pages).

\* cited by examiner

APFC CONTROL CIRCUIT, METHOD, AND SYSTEM

CROSS REFERENCE

The present application claims priority of China Patent Application No. 202211565878.0 filed on Dec. 7, 2022, the entire contents of which are hereby incorporated by reference.

TECHNICAL FIELD

The present disclosure relates to the field of control technologies, and in particular to an APFC control circuit, a method, and a system.

BACKGROUND

In industrial power supply, it is necessary to convert industrial-frequency alternating current (AC) power into direct current (DC) power. Although a conventional full-bridge rectifier filter circuit realizes the function of converting AC to DC, the distortion is serious and total harmonic distortion (THD) is extremely high, and the large number of the conventional full-bridge rectifier filter circuits will affect the normal operation of the power grid.

An existing power factor correction (PFC) converter is another device that converts AC power into DC power. The conversion process can improve the power factor and increase the power utilization of the power grid: in addition, it can reduce the harmonic content and reduce the voltage distortion, loss, and mis-operation, etc. of the power grid. At present, an active PFC (APFC) converter is widely used.

Usually, the sampler and controller applied in the APFC converter have sampling delay and control delay, which makes the control untimely, resulting in lower power factor (PF) and higher THD value.

SUMMARY OF THE DISCLOSURE

The main technical problem solved by the embodiments of the present disclosure is to provide an APFC control circuit, method, and system that can reduce the control delay of the APFC converter circuit, thereby reducing the THD value and improving the PF value.

To solve the above technical problems, one of the technical solutions adopted in the embodiments of the present disclosure is: an active power factor correction (APFC) control circuit, configured to control turning-on and turning-off of a main switch tube of a boost module in an APFC converter circuit: wherein the APFC converter circuit includes a start-up current limiting module, a first filter module, a rectifier module, a second filter module, and the boost module connected in sequence; the start-up current limiting module is configured to access utility power and the boost module is connected to a load: wherein the APFC control circuit includes: a sampling correction module, a zero-pole compensation module, a first control module, a data processing module, and a second control module: the sampling correction module is connected to the utility power and the boost module for sampling and correcting a utility voltage of the utility power, and an inductor current and a bus voltage of the boost module, to obtain a utility correction voltage, an inductor correction current, and a bus correction voltage, respectively: the zero-pole compensation module is connected to the sampling correction module for zero-pole compensation of the sampled utility voltage, inductor current, and bus voltage to make phases of the utility correction voltage, the inductor correction current, and the bus correction voltage consistent with phases of an actual utility voltage, an actual inductor current, and an actual bus voltage, respectively: a first input of the first control module is connected to a target voltage, and a second input of the first control module is connected to the sampling correction module for comparing the bus correction voltage with the target voltage and outputting a voltage adjustment coefficient: a first input of the data processing module is connected to the first control module, and a second input of the data processing module is connected to the sampling correction module for obtaining a reference current according to the utility correction voltage and the voltage adjustment coefficient: a first input of the second control module is connected to the data processing module, and a second input of the second control module is connected to the sampling correction module for outputting a target control signal to the main switch tube according to the reference current and the inductor correction current.

To solve the above technical problems, another technical solution adopted in the embodiments of the present disclosure is: an APFC control method, applied to the APFC control circuit as described above: wherein the APFC control circuit is configured to control turning-on and turning-off of the main switch tube of the boost module in the APFC converter circuit: the method includes: sampling and correcting the utility voltage of the utility power, and the inductor current and the bus voltage of the boost module, to obtain the utility correction voltage, the inductor correction current, and the bus correction voltage, respectively: performing zero-pole compensation on the sampled utility voltage, inductor current, and bus voltage to make the phases of the utility correction voltage, the inductor correction current, and the bus correction voltage consistent with the phases of the actual utility voltage, the actual inductor current, and the actual bus voltage, respectively: comparing the bus correction voltage with the target voltage and outputting the voltage adjustment coefficient: obtaining the reference current according to the utility correction voltage and the voltage adjustment coefficient: and outputting the target control signal to the main switch tube according to the reference current and the inductor correction current.

To solve the above technical problems, further another technical solution adopted in the embodiments of the present disclosure is: an APFC control system, including: the APFC converter circuit and the APFC control circuit as above.

BRIEF DESCRIPTION OF THE DRAWINGS

One or more embodiments are illustrated exemplarily by means of the accompanying drawings corresponding thereto. These exemplary illustrations do not constitute a limitation of the embodiments, components having the same reference numerical designation in the accompanying drawings are indicated as similar components, and the drawings in the accompanying drawings do not constitute a limitation of scale unless specifically asserted.

DETAILED DESCRIPTION

In order to make the object, technical solutions, and advantages of the present disclosure more clearly understood, the present disclosure is described in further detail hereinafter in conjunction with the accompanying drawings and embodiments. It should be understood that the specific embodiments described herein are intended only to explain the present disclosure and are not intended to limit it.

It is to be noted that, if not conflicting, the various features in the embodiments of the present disclosure can be combined with each other and are all within the scope of the present disclosure. Further, although the division of functional modules is carried out in the device schematic vies and the logical sequence is shown in the flowchart, in some cases the steps shown or described can be performed in a different order shown in the flowchart or with different division of modules in the device schematic view.

Unless otherwise defined, all technical and scientific terms used in this specification have the same meaning as commonly understood by those skilled in the art belonging to the present disclosure. The terms used in the specification of the present disclosure are intended only for describing specific embodiments and are not intended to limit the present disclosure. The term "and/or" as used in this specification includes any and all combinations of one or more of relevant listed items.

Figure 1:
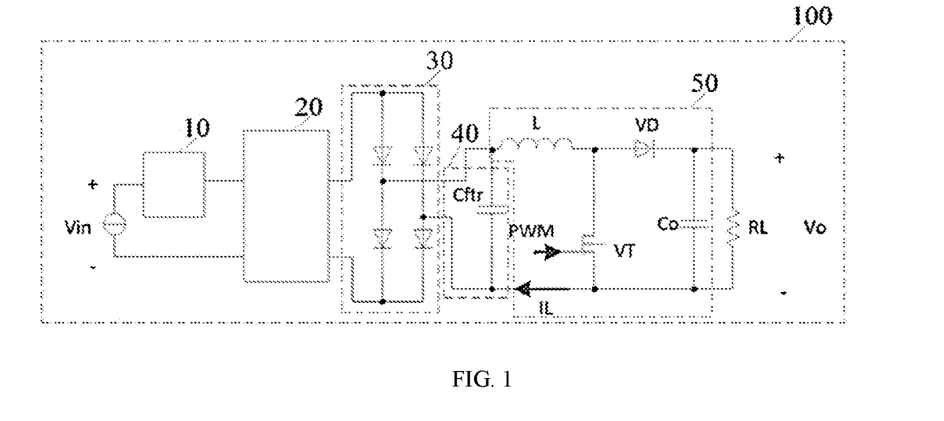
FIG. 1 is a structural schematic view of an APFC converter circuit according to an embodiment of the present disclosure.

Referring to FIG. 1, FIG. 1 is a structural schematic view of an APFC converter circuit according to an embodiment of the present disclosure.

The APFC converter circuit 100 includes a start-up current limiting module 10, a first filter module 20, a rectifier module 30, a second filter module 40, and a boost module 50 connected in sequence, where the start-up current limiting module 10 is configured to access utility power and the boost module 50 is connected to a load.

The start-up current limiting module 10 may include a resistor. The rectifier module 30 is a full-bridge rectifier including four rectifier diodes. The first filter module 20 may be an LC filter including an inductor and a capacitor. The second filter module 40 may be a filter capacitor Cftr. The load may be represented by a resistor RL. The boost module 50 is a classical Boost PFC circuit topology including an inductor L, a diode VD, a capacitor Co, and a main switch tube VT.

Specifically, the utility voltage Vin passes sequentially through the start-up current limiting module 10, the first filter module 20, the rectifier module 30, the second filter module 40, and the boost module 50 to the load. After a period of time, e.g., after 1 second, the APFC control circuit short-circuits the start-up limiter module 10. The utility voltage Vin from the utility power is filtered by the first filter module 20 and then rectified by the rectifier module 30 to rectify the sinusoidal AC power from the city network into a half-wave rectifier waveform, and passes through the filter capacitor Cftr to make a deadband voltage of the rectifier diodes smooth. The filtered half-wave rectifier waveform is passed into the boost module 50. The main switch tube VT of the boost module 50 is controlled on and off by the APFC control circuit as described below, and the boost module 50 performs a boost process and finally supplies power to the load.

Figure 2:
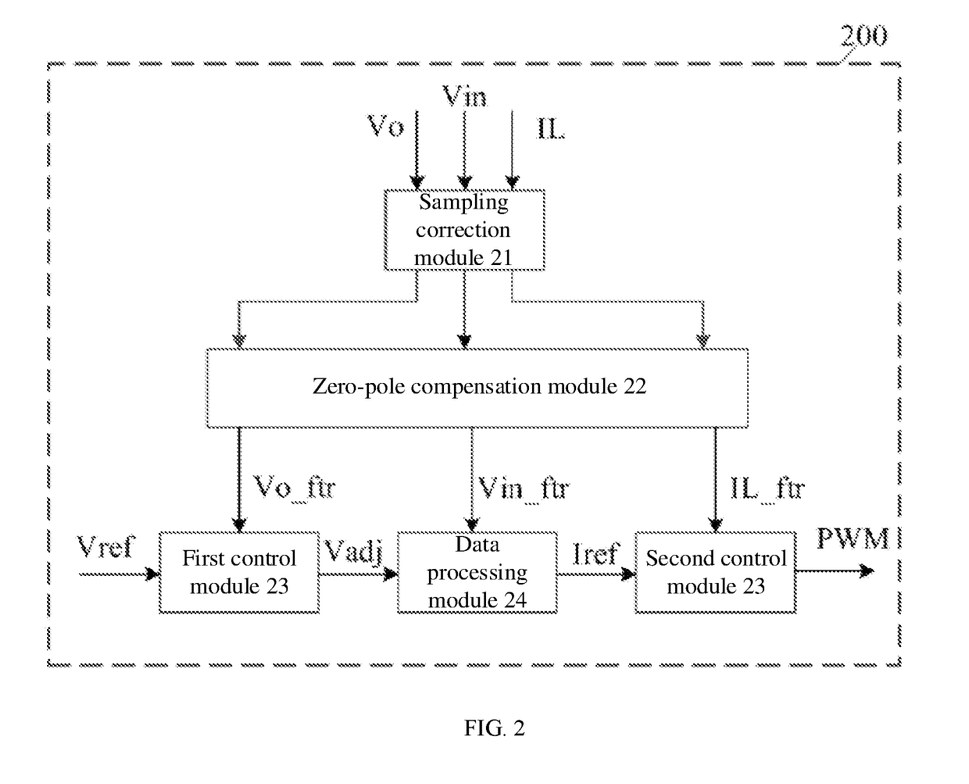
FIG. 2 is a structural schematic view of an APFC control circuit according to an embodiment of the present disclosure.

Referring to FIG. 2, FIG. 2 is a structural schematic view of an APFC control circuit according to an embodiment of the present disclosure. The APFC control circuit 200 is configured to control turning-on and turning-off of the main switch tube VT of the boost module 50 in the APFC converter circuit 100.

The APFC control circuit 200 includes a sampling correction module 21, a zero-pole compensation module 22, a first control module 23, a data processing module 24, and a second control module 25.

The sampling correction module 21 is connected to the utility power and the boost module 50 for sampling and correcting the utility voltage Vin of the utility power, and an inductor current IL and a bus voltage Vo of the boost module 50 to obtain a utility correction voltage Vin_ftr, an inductor correction current IL_ftr, and a bus correction voltage Vo_ftr, respectively.

The utility voltage Vin is a voltage of the utility power, the inductor current IL is a current of the inductor L of the boost module 50, and the bus voltage Vo is a voltage across the capacitor Co.

The zero-pole compensation module 22 is connected to the sampling correction module 21 for zero-pole compensation of the sampled utility voltage Vin, inductor current IL, and bus voltage Vo to make the phases of the utility correction voltage Vin_ftr, the inductor correction current IL_ftr, and the bus correction voltage Vo_ftr consistent with the phases of an actual utility voltage, an actual inductor current, and an actual bus voltage, respectively.

A first input of the first control module 23 is connected to a target voltage Vref, and a second input of the first control module 23 is connected to the sampling correction module 21 for comparing the bus correction voltage Vo_ftr with the target voltage Vref and outputting a voltage adjustment coefficient Vadj.

A first input of the data processing module 24 is connected to the first control module 23, and a second input of the data processing module 24 is connected to the sampling correction module 21 for obtaining a reference current Iref according to the utility correction voltage Vin_ftr and the voltage adjustment coefficient Vadj.

A first input of the second control module 25 is connected to the data processing module 24, and a second input of the second control module 25 is connected to the sampling correction module 21 for outputting a target control signal PWM to the main switch tube VT according to the reference current Iref and the inductor correction current IL_ftr.

The first control module 23, the data processing module 24, and the second control module 25 may be assembled as a digital signal processing (DSP) chip or another control chip that can implement functions of the first control module 23, the data processing module 24, and the second control module 25.

Specifically, the workflow of the first control module 23, the data processing module 24, and the second control module 25 is as follows.

First, the first control module 23 obtains the target voltage Vref and the bus correction voltage Vo_ftr, the first control module 23 takes a difference between the target voltage Vref and the bus correction voltage Vo_ftr as a voltage input error, and the first control module 23 outputs the voltage adjustment coefficient Vadj according to the voltage input error.

Then, the data processing module 24 calculates and obtains the reference current Iref according to the voltage adjustment coefficient Vadj and the utility correction voltage Vin_ftr with the calculation formula as follows.

$$Iref = \frac{Vadj \times 2 \times P0 \times |Vin\_ftr|}{\left(Vin + ftr \times \sqrt{2} \times \frac{2}{\pi}\right)^2}.$$

where $Po = \frac{Vo + ftr^2}{RL}$,

RL is the resistance value of the resistor RL in FIG. 1.

Finally, the second control module 25 takes a difference between the reference current Iref and the inductor correction current IL_ftr as a current input error, and the second control module 25 outputs the target control signal PWM to a control end of the main switch tube VT according to the current input error, so as to drive the main switch tube VT to realize the power factor correction of the APFC converter circuit 100.

The APFC control circuit provided in the embodiments of the present disclosure reduces the control delay of the APFC converter circuit by means of the zero-pole compensation module 22, thereby reducing the THD value of the APFC converter circuit and increasing the PF value.

Figure 3:
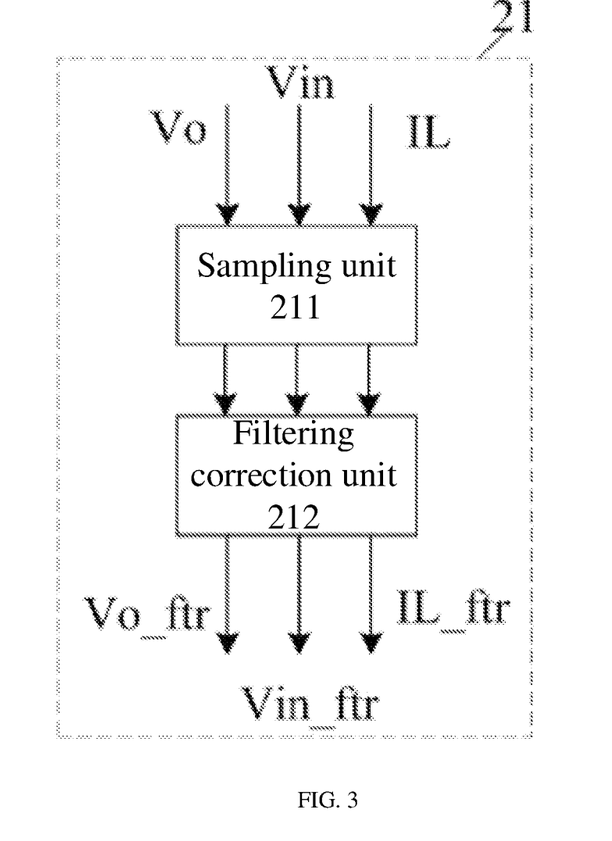
FIG. 3 is structural schematic view of a sampling correction module according to an embodiment of the present disclosure.

Referring to FIG. 3, FIG. 3 is structural schematic view of a sampling correction module according to an embodiment of the present disclosure.

In some embodiments, the sampling correction module 21 includes: a sampling unit 211 and a filtering correction unit 212.

The sampling unit 211 is connected to the utility power and the boost module 50 for sampling the utility voltage Vin, the inductor current IL, and the bus voltage Vo.

The filtering correction unit 212 is connected to the sampling unit 211 for filtering and correcting the utility voltage Vin, the inductor current IL, and the bus voltage Vo to obtain the utility correction voltage Vin_ftr, the inductor correction current IL_ftr, and the bus correction voltage Vo_ftr, respectively.

Specifically, each of the first control module 23, the data processing module 24, and the second control module 25 may trigger a digital-to-analog converter (ADC) to enable the sampling unit 211 to sample the utility voltage Vin, the inductor current IL, and the bus voltage Vo.

A control frequency fo for triggering the bus voltage Vo may be set to 2 kHz≤fo≤10 kHz, and a control frequency fin for triggering the inductor current IL and input voltage Vin may be the same control frequency fin, which may be set to 40 kHz≤fin≤100 kHz.

Figure 4:
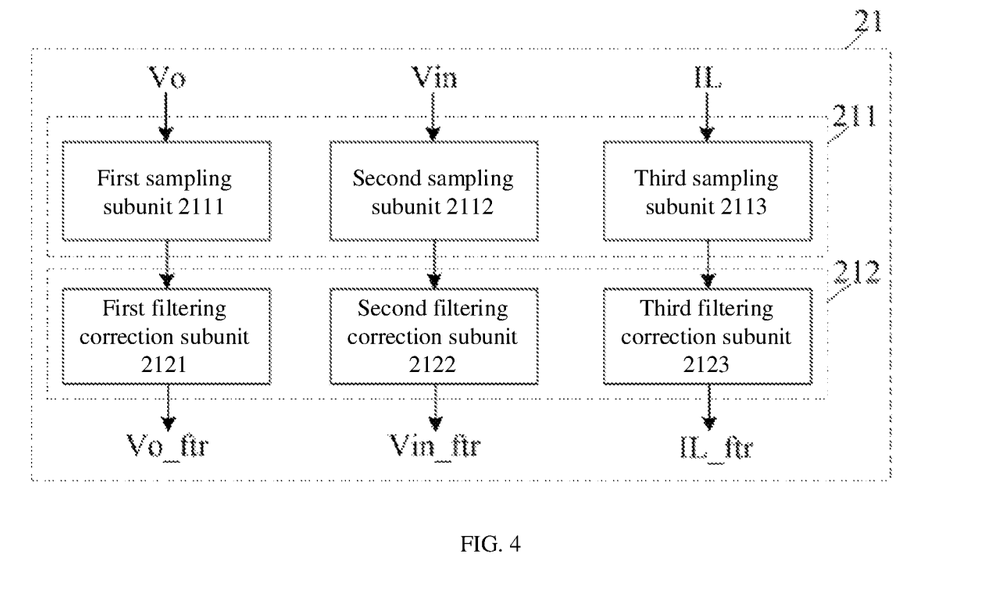
FIG. 4 is structural schematic view of a sampling unit and a filtering correction unit according to an embodiment of the present disclosure.

Referring to FIG. 4, FIG. 4 is structural schematic view of a sampling unit and a filtering correction unit according to an embodiment of the present disclosure.

In some embodiments, the sampling unit 211 includes: a first sampling subunit 2111, a second sampling subunit 2112, and a third sampling subunit 2113.

The first sampling subunit 2111 is connected to the boost module 50 for sampling the bus voltage Vo of the boost module 50, the second sampling subunit 2112 is connected to the utility power for sampling the utility voltage Vin of the utility power, and the third sampling subunit 2113 is connected to the boost module 50 for sampling the inductor current IL of the boost module 50.

Specifically, the first sampling subunit 2111, the second sampling subunit 2112, and the third sampling subunit 2113 may be corresponding sampling chips.

In some embodiments, the filtering correction unit 212 includes: a first filtering correction subunit 2121, a second filtering correction subunit 2122, and a third filtering correction subunit 2123.

The first filtering correction subunit 2121 is connected to the first sampling subunit 2111 for filtering and correcting the bus voltage Vo to obtain the bus correction voltage Vo_ftr. The second filtering correction subunit 2122 is connected to the second sampling subunit 2112 for filtering and correcting the utility voltage Vin to obtain the utility correction voltage Vin_ftr. The third filtering correction subunit 2123 is connected to the third extraction unit 2113 for filtering and correcting the inductor current IL to obtain the inductor correction current IL_ftr.

Specifically, the utility voltage Vin, the inductor current IL, and the bus voltage Vo are required to be filtered and corrected. The first filtering correction subunit 2121, the second filtering correction subunit 2122, and the third filtering correction subunit 2123 are filtered according to the following equation.

$$A\_Filt=(2*pi*fs*Ts)/(2*pi*vfs*Ts+1).$$

$$B\_Filt=1-A\_Filt.$$

$$y(k)=A\_Filt*x(k)+B\_Filt*y(k-1).$$

where x is an input, y is an output, fs is a cutoff frequency, Ts is a control frequency, and k is a time discrete value.

The calibration of the first filtering subunit 2121, the second filtering subunit 2122, and the third filtering subunit 2123 are performed according to the following equations.

$$f(x)=k*x+b.$$

where x is an input, f(x) is an output, k is a correction factor, and b is a correction bias.

The utility voltage Vin, the inductor current IL, and the bus voltage Vo are filtered and corrected, and then converted to the utility correction voltage Vin_ftr, the inductor correction current IL_ftr, and the bus correction voltage Vo_ftr, respectively.

In some embodiments, the zero-pole compensation module 22 is specifically configured to perform the following operations.

obtaining a delay angle θ, the utility voltage Vin, the inductor current IL, and the bus voltage Vo.

performing zero-pole compensation on the utility voltage Vin, the inductor current IL, and the bus voltage Vo according to the delay angle θ to obtain a utility compensation voltage, an inductor compensation current, and a bus compensation voltage, respectively.

Figure 7:
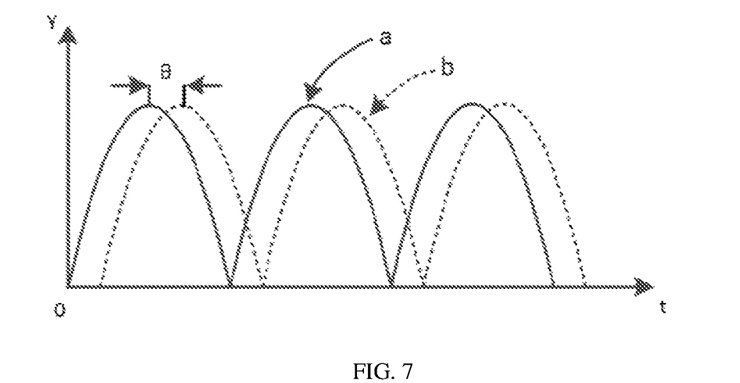
FIG. 7 is a schematic view of a waveform of a bus voltage collected in an embodiment of the present disclosure and a waveform of an actual bus voltage.

Referring to FIG. 7, FIG. 7 is a schematic view of a waveform b of a bus voltage collected in an embodiment of the present disclosure and a waveform a of an actual bus voltage. It should be noted that in FIG. 7, FIG. 8, and FIG. 9, the waveforms in the solid line are all the waveform of the actual bus voltage, and the waveforms in the dashed line are all waveforms of the bus voltage Vo collected by the APFC control circuit 200.

As illustrated in FIG. 7, the bus voltage Vo sampled by the APFC control circuit 200 of the present embodiments is delayed from the actual bus voltage. Similarly, the sampled utility voltage Vin is also delayed from the actual bus voltage, and the sampled inductor current IL is also delayed from the actual inductor current IL_ftr. The main reason is that the digital-to-analog conversion sampling is completed by the hardware circuit and the sampling chip, there is a delay in the sampling, quantization, and coding process, and the DSP chip also delays in processing the sampled signal, which results in a phase delay with a delay angle θ as shown in FIG. 7.

In order to solve the problem of the phase delay with the delay angle θ, the embodiments of the present disclosure propose the zero-pole compensation module 22, whose expressions for the input and output are as follows.

$$G(s)=K*(s+Wz)/(s+Wp).$$

where, Wz is less than Wp.

The zero-pole compensation of all the sampled data may eliminate the problem of phase delay.

Figure 8:
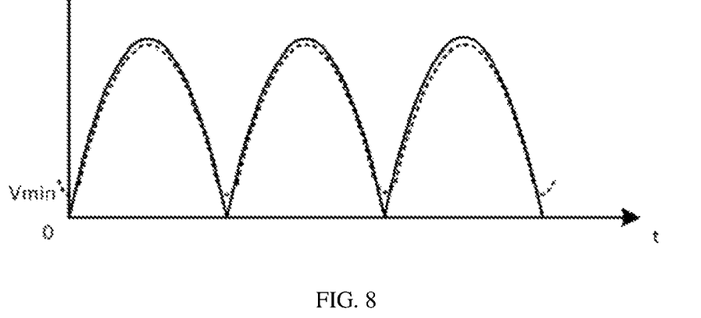
FIG. 8 is a schematic view of a waveform of a bus compensation voltage in an embodiment of the present disclosure and a waveform of the actual bus voltage.

As shown in FIG. 8, the phase of the waveform of the bus compensation voltage and the waveform of the actual bus voltage basically coincide. However, the compensated data does not reach zero, and the minimum value Vmin is greater than zero. Although the PF value is improved, the THD value is still large at the over-zero point. For this reason, the embodiments of the present disclosure provide a zero-value assignment module 26.

Figure 5:
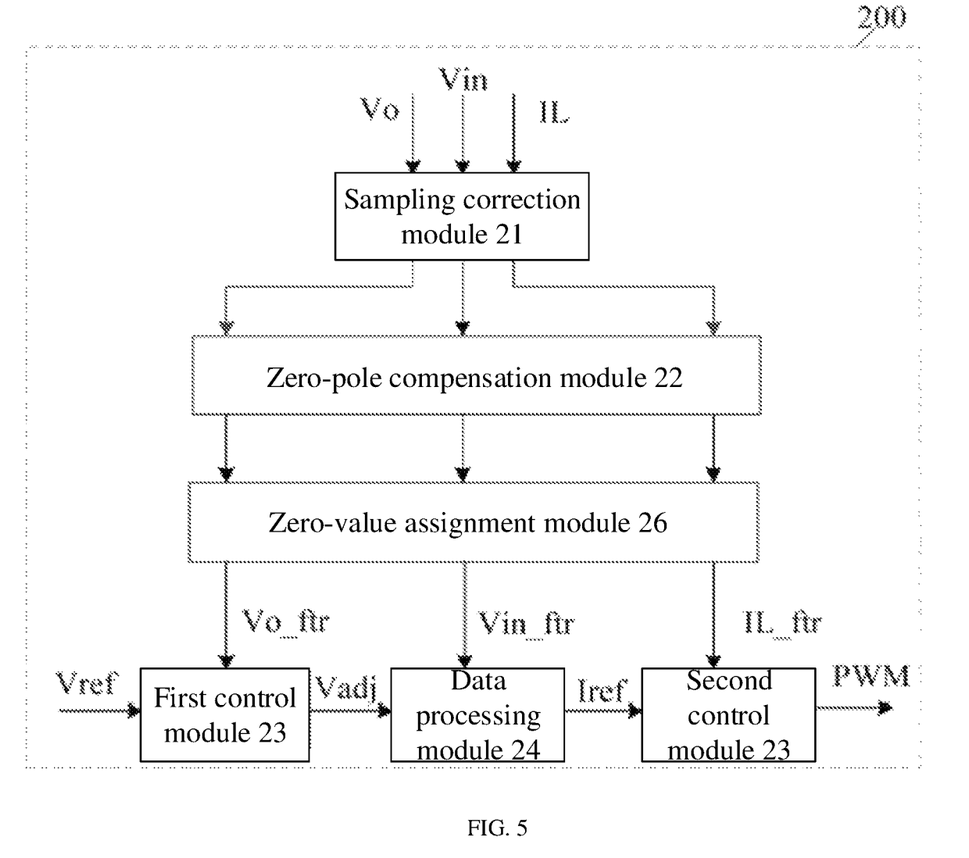
FIG. 5 is a structural schematic view of an APFC control circuit according to another embodiment of the present disclosure.

Referring to FIG. 5, FIG. 5 is a structural schematic view of an APFC control circuit according to another embodiment of the present disclosure.

In some embodiments, the APFC control circuit 200 further includes a zero-value assignment module 26, which is connected to the zero-pole compensation module 22 for assigning zero points to the utility compensation voltage, the inductor compensation current, and the bus compensation voltage.

Figure 9:
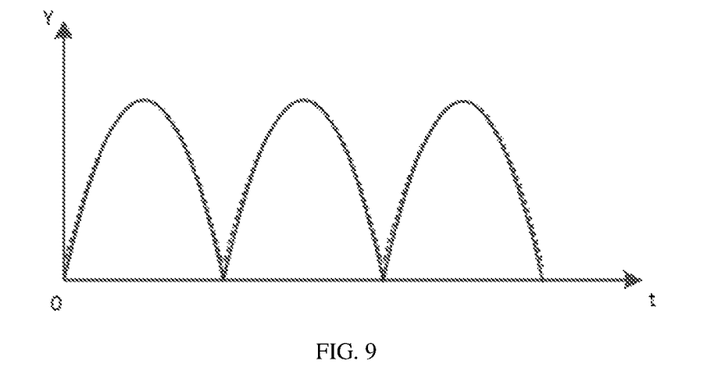
FIG. 9 is a schematic view of a waveform of a voltage after a bus compensation voltage is assigned to zero in an embodiment of the present disclosure and a waveform of an actual bus voltage.
Figure 10:
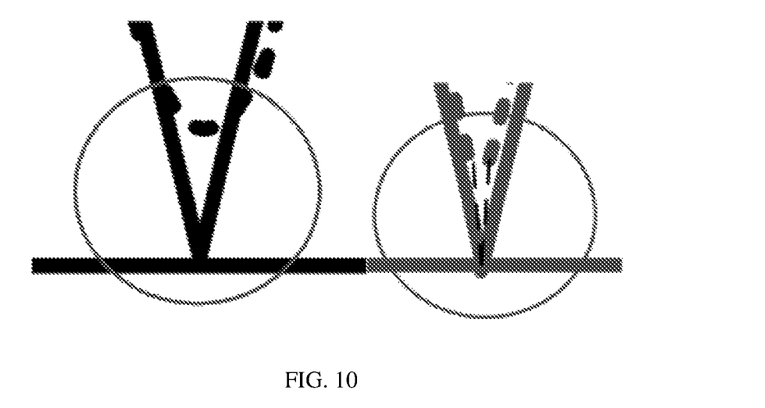
FIG. 10 is a schematic view comparing details of FIG. 8 with those of FIG. 9.

In view of the drawback that the THD value is still large at the over-zero point, the present disclosure further proposes to assign zero value to the sampling data at a point of the waveform of the sampling data with the angle θ of 0. The specific change curve is shown in FIG. 9, and the waveform and zero value of the voltage after the bus compensation voltage is assigned zero are basically the same as the phase and zero value of the waveform of the actual bus voltage. FIG. 10 is a detailed comparison between FIG. 8 and FIG. 9. It can be clearly seen that the waveform has a zero point after zero assignment. In this way, the control using the zero-value assignment processed data is able to improve the PF value of the APFC converter circuit and reduce the THD value of the APFC converter circuit.

Figure 6:
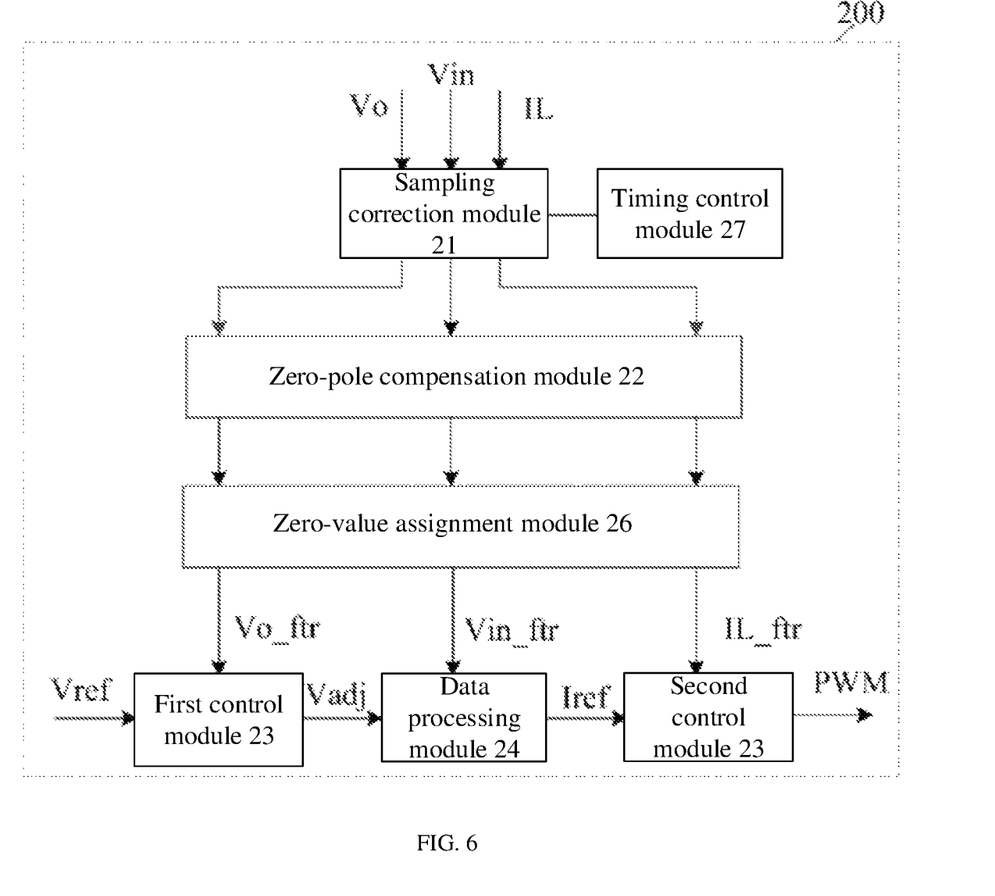
FIG. 6 is a structural schematic view of an APFC control circuit according to further another embodiment of the present disclosure.

Referring to FIG. 6, FIG. 6 is a structural schematic view of an APFC control circuit according to further another embodiment of the present disclosure.

In some embodiments, the APFC device further includes: a timing control module 27, which is connected to the start-up current limiting module 10 of the APFC converter circuit 100 for controlling the start-up current limiting module 10 to short circuit when the bus voltage Vo is greater than a preset voltage.

Specifically, the APFC converter circuit 100 starts when the utility voltage Vin reaches the preset voltage V, e.g., 220V, at which time no target control signal PWM is sent to the main switch tube VT and the utility voltage Vin directly charges the capacitor Co.

The timing control module 27 is configured to control the start-up current limiting module 10 to short circuit and cut out, when the bus voltage Vo of the capacitor Co is greater than Kf*Vin (0<Kf<0.3), the timing control module 27 starts timing from a start of APFC converter circuit 100, and a timing time is greater than Ta (Ta>1 s).

The APFC control circuit 200 provides an APFC control circuit 200, which controls the turning-on and turning-off of the main switch tube VT of the boost module 50 in the APFC converter circuit 100. The APFC converter circuit 100 includes a start-up current limiting module 10, a first filter module 20, a rectifier module 30, a second filter module 40, and a boost module 50 connected in sequence, where the start-up current limiting module 10 is configured to access utility power and the boost module 50 is connected to a load. The APFC control circuit 200 includes: a sampling correction module 21, a zero-pole compensation module 22, a first control module 23, a data processing module 24, and a second control module 25. The sampling correction module 21 is connected to the utility power and the boost module 50 for sampling and correcting the utility voltage Vin of the utility power, and an inductor current IL and a bus voltage Vo of the boost module 50 to obtain a utility correction voltage Vin_ftr, an inductor correction current IL_ftr, and a bus correction voltage Vo_ftr, respectively. The zero-pole compensation module 22 is connected to the sampling correction module 21 for zero-pole compensation of the sampled utility voltage Vin, inductor current IL, and bus voltage Vo to make the phases of the utility correction voltage Vin_ftr, the inductor correction current IL_ftr, and the bus correction voltage Vo_ftr consistent with the phases of an actual utility voltage, an actual inductor current, and an actual bus voltage, respectively. A first input of the first control module 23 is connected to a target voltage Vref, and a second input of the first control module 23 is connected to the sampling correction module 21 for comparing the bus correction voltage Vo_ftr with the target voltage Vref and outputting a voltage adjustment coefficient Vadj. A first input of the data processing module 24 is connected to the first control module 23, and a second input of the data processing module 24 is connected to the sampling correction module 21 for obtaining a reference current Iref according to the utility correction voltage Vin_ftr and the voltage adjustment coefficient Vadj. A first input of the second control module 25 is connected to the data processing module 24, and a second input of the second control module 25 is connected to the sampling correction module 21 for outputting a target control signal PWM to the main switch tube VT according to the reference current Iref and the inductor correction current IL_ftr. The APFC control circuit 200 provided in the embodiments of the present disclosure is capable of reducing the control delay of the APFC converter circuit 100, thereby reducing the THD value of the APFC converter module 100 and improving the PF value of the APFC converter module 100.

Figure 11:
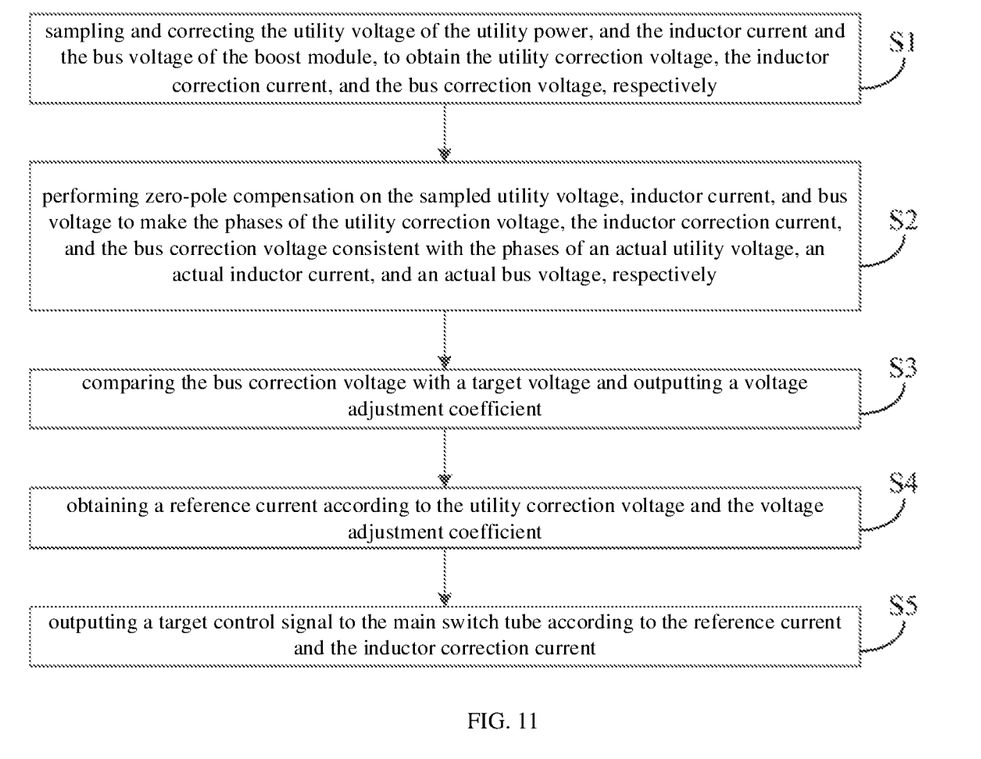
FIG. 11 is a schematic flowchart of an APFC control method according to an embodiment of the present disclosure.

Referring to FIG. 11, FIG. 11 is a schematic flowchart of an APFC control method according to an embodiment of the present disclosure.

The APFC control method is applied to the APFC control circuit as described above, which controls the turning-on and turning-off of the main switch tube of the boost module in the APFC converter circuit.

The APFC control method includes operations at blocks illustrated in FIG. 11.

At block S1: sampling and correcting the utility voltage of the utility power, and the inductor current and the bus voltage of the boost module, to obtain the utility correction voltage, the inductor correction current, and the bus correction voltage, respectively.

At block S2: performing zero-pole compensation on the sampled utility voltage, inductor current, and bus voltage to make the phases of the utility correction voltage, the inductor correction current, and the bus correction voltage consistent with the phases of an actual utility voltage, an actual inductor current, and an actual bus voltage, respectively.

At block S3: comparing the bus correction voltage with a target voltage and outputting a voltage adjustment coefficient.

At block S4: obtaining a reference current according to the utility correction voltage and the voltage adjustment coefficient.

At block S5: outputting a target control signal to the main switch tube according to the reference current and the inductor correction current.

In some embodiments, the performing zero-pole compensation on the sampled utility voltage, inductor current, and bus voltage includes:

obtaining a delay angle, the utility voltage, the inductor current, and the bus voltage.

performing zero-pole compensation on the utility voltage, the inductor current, and the bus voltage according to the delay angle to obtain a utility compensation voltage, an inductor compensation current, and a bus compensation voltage.

It should be noted that the APFC control method provided in the above embodiments of the present disclosure is applied to the above APFC control circuit, and the APFC control circuit has the corresponding functional modules and beneficial effects of the execution method. Technical details not described in detail in the APFC control method embodiments can be found in the APFC control circuit provided in the embodiments of the present disclosure.

Embodiments of the present disclosure further provide an APFC control system, the APFC control system including: the APFC converter circuit 100 and the APFC control circuit 200 as described above. Reference may be made to the APFC converter circuit 100 and APFC control circuit 200 described above, which will not be repeated herein.

Finally, it should be noted that the above embodiments are intended only to illustrate the technical solution of the present disclosure and not to limit it: in the idea of the present disclosure, the above embodiments or technical features in different embodiments can also be combined with each other, the steps can be implemented in any order, and many other variations of different aspects of the present disclosure exist as described above, which are not provided in detail for the sake of brevity: although with reference to the foregoing embodiments for a detailed description of the present disclosure, it should be understood by those skilled in the art: it is still possible to modify the technical solutions documented in the preceding embodiments, or to make equivalent substitutions of some of them; and these modifications or substitutions do not take the essence of the corresponding technical solutions out of the scope of the technical solutions in the embodiments of the present disclosure.

What is claimed is:

1. An active power factor correction (APFC) control circuit, configured to control turning-on and turning-off of a main switch tube of a boost module in an APFC converter circuit; wherein the APFC converter circuit comprises a start-up current limiting module, a first filter module, a rectifier module, a second filter module, and the boost module connected in sequence: the start-up current limiting module is configured to access utility power and the boost module is connected to a load;

wherein the APFC control circuit comprises a sampling correction module, a zero-pole compensation module, a first control module, a data processing module, and a second control module;

the sampling correction module is connected to the utility power and the boost module for sampling and correcting a utility voltage of the utility power, and an inductor current and a bus voltage of the boost module, to obtain a utility correction voltage, an inductor correction current, and a bus correction voltage, respectively;

the zero-pole compensation module is connected to the sampling correction module for zero-pole compensation of the sampled utility voltage, inductor current, and bus voltage to make phases of the utility correction voltage, the inductor correction current, and the bus correction voltage consistent with phases of an actual utility voltage, an actual inductor current, and an actual bus voltage, respectively;

a first input of the first control module is connected to a target voltage, and a second input of the first control module is connected to the sampling correction module for comparing the bus correction voltage with the target voltage and outputting a voltage adjustment coefficient;

a first input of the data processing module is connected to the first control module, and a second input of the data processing module is connected to the sampling correction module for obtaining a reference current according to the utility correction voltage and the voltage adjustment coefficient;

a first input of the second control module is connected to the data processing module, and a second input of the second control module is connected to the sampling correction module for outputting a target control signal to the main switch tube according to the reference current and the inductor correction current.

2. The APFC control circuit according to claim 1, wherein the zero-pole compensation module is specifically configured to perform:

obtaining a delay angle, the utility voltage, the inductor current, and the bus voltage; and performing zero-pole compensation on the utility voltage, the inductor current, and the bus voltage according to the delay angle to obtain a utility compensation voltage, an inductor compensation current, and a bus compensation voltage, respectively.

3. The APFC control circuit according to claim 2, further comprising:

a zero-value assignment module, connected to the zero-pole compensation module for assigning zero points to the utility compensation voltage, the inductor compensation current, and the bus compensation voltage.

4. The APFC control circuit according to claim 1, wherein the sampling correction module comprises: a sampling unit and a filtering correction unit;

the sampling unit is connected to the utility power and the boost module for sampling the utility voltage, the inductor current, and the bus voltage;

the filtering correction unit is connected to the sampling unit for filtering and correcting the utility voltage, the inductor current, and the bus voltage to obtain the utility correction voltage, the inductor correction current, and the bus correction voltage, respectively.

5. The APFC control circuit according to claim 4, wherein the sampling unit comprises: a first sampling subunit, a second sampling subunit, and a third sampling subunit;

the first sampling subunit is connected to the boost module for sampling the bus voltage of the boost module;

the second sampling subunit is connected to the utility power for sampling the utility voltage of the utility power;

the third sampling subunit is connected to the boost module for sampling the inductor current of the boost module.

6. The APFC control circuit according to claim 5, wherein the filtering correction unit comprises: a first filtering correction subunit, a second filtering correction subunit, and a third filtering correction subunit;

the first filtering correction subunit is connected to the first sampling subunit for filtering and correcting the bus voltage to obtain the bus correction voltage;

the second filtering correction subunit is connected to the second sampling subunit for filtering and correcting the utility voltage to obtain the utility correction voltage;

the third filtering correction subunit is connected to the third extraction unit for filtering and correcting the inductor current to obtain the inductor correction current.

7. The APFC control circuit according to claim 6, further comprising:

a timing control module, connected to the start-up current limiting module for controlling the start-up current limiting module to short circuit in response to the bus voltage being greater than a preset voltage.

8. An active power factor correction (APFC) control method, applied to an APFC control circuit; wherein the APFC control circuit is configured to control turning-on and turning-off of a main switch tube of a boost module in an APFC converter circuit; the APFC converter circuit comprises a start-up current limiting module, a first filter module, a rectifier module, a second filter module, and the boost module connected in sequence; the start-up current limiting module is configured to access utility power and the boost module is connected to a load;

wherein the APFC control circuit comprises a sampling correction module, a zero-pole compensation module, a first control module, a data processing module, and a second control module;

the sampling correction module is connected to the utility power and the boost module for sampling and correcting a utility voltage of the utility power, and an inductor current and a bus voltage of the boost module, to obtain a utility correction voltage, an inductor correction current, and a bus correction voltage, respectively;

the zero-pole compensation module is connected to the sampling correction module for zero-pole compensation of the sampled utility voltage, inductor current, and bus voltage to make phases of the utility correction voltage, the inductor correction current, and the bus correction voltage consistent with phases of an actual utility voltage, an actual inductor current, and an actual bus voltage, respectively;

a first input of the first control module is connected to a target voltage, and a second input of the first control module is connected to the sampling correction module for comparing the bus correction voltage with the target voltage and outputting a voltage adjustment coefficient;

a first input of the data processing module is connected to the first control module, and a second input of the data processing module is connected to the sampling correction module for obtaining a reference current according to the utility correction voltage and the voltage adjustment coefficient;

a first input of the second control module is connected to the data processing module, and a second input of the second control module is connected to the sampling correction module for outputting a target control signal to the main switch tube according to the reference current and the inductor correction current;

the method comprises:

sampling and correcting the utility voltage of the utility power, and the inductor current and the bus voltage of the boost module, to obtain the utility correction voltage, the inductor correction current, and the bus correction voltage, respectively;

performing zero-pole compensation on the sampled utility voltage, inductor current, and bus voltage to make the phases of the utility correction voltage, the inductor correction current, and the bus correction voltage consistent with the phases of the actual utility voltage, the actual inductor current, and the actual bus voltage, respectively;

comparing the bus correction voltage with the target voltage and outputting the voltage adjustment coefficient;

obtaining the reference current according to the utility correction voltage and the voltage adjustment coefficient; and outputting the target control signal to the main switch tube according to the reference current and the inductor correction current.

9. The APFC control method according to claim 8, wherein the performing zero-pole compensation on the sampled utility voltage, inductor current, and bus voltage comprises:

obtaining a delay angle, the utility voltage, the inductor current, and the bus voltage; and performing zero-pole compensation on the utility voltage, the inductor current, and the bus voltage according to the delay angle to obtain a utility compensation voltage, an inductor compensation current, and a bus compensation voltage.

10. The APFC control method according to claim 9, wherein the APFC control circuit further comprises:

a zero-value assignment module, connected to the zero-pole compensation module for assigning zero points to the utility compensation voltage, the inductor compensation current, and the bus compensation voltage.

11. The APFC control method according to claim 8, wherein the sampling correction module comprises: a sampling unit and a filtering correction unit;

the sampling unit is connected to the utility power and the boost module for sampling the utility voltage, the inductor current, and the bus voltage;

the filtering correction unit is connected to the sampling unit for filtering and correcting the utility voltage, the inductor current, and the bus voltage to obtain the utility correction voltage, the inductor correction current, and the bus correction voltage, respectively.

12. The APFC control method according to claim 11, wherein the sampling unit comprises: a first sampling subunit, a second sampling subunit, and a third sampling subunit;
the first sampling subunit is connected to the boost module for sampling the bus voltage of the boost module;
the second sampling subunit is connected to the utility power for sampling the utility voltage of the utility power;
the third sampling subunit is connected to the boost module for sampling the inductor current of the boost module.

13. The APFC control method according to claim 12, wherein the filtering correction unit comprises: a first filtering correction subunit, a second filtering correction subunit, and a third filtering correction subunit;
the first filtering correction subunit is connected to the first sampling subunit for filtering and correcting the bus voltage to obtain the bus correction voltage;
the second filtering correction subunit is connected to the second sampling subunit for filtering and correcting the utility voltage to obtain the utility correction voltage;
the third filtering correction subunit is connected to the third extraction unit for filtering and correcting the inductor current to obtain the inductor correction current.

14. An active power factor correction (APFC) control system, comprising: an APFC converter circuit and an APFC control circuit; wherein the APFC control circuit is configured to control turning-on and turning-off of a main switch tube of a boost module in an APFC converter circuit; the APFC converter circuit comprises a start-up current limiting module, a first filter module, a rectifier module, a second filter module, and the boost module connected in sequence; the start-up current limiting module is configured to access utility power and the boost module is connected to a load;
wherein the APFC control circuit comprises a sampling correction module, a zero-pole compensation module, a first control module, a data processing module, and a second control module;
the sampling correction module is connected to the utility power and the boost module for sampling and correcting a utility voltage of the utility power, and an inductor current and a bus voltage of the boost module, to obtain a utility correction voltage, an inductor correction current, and a bus correction voltage, respectively;
the zero-pole compensation module is connected to the sampling correction module for zero-pole compensation of the sampled utility voltage, inductor current, and bus voltage to make phases of the utility correction voltage, the inductor correction current, and the bus correction voltage consistent with phases of an actual utility voltage, an actual inductor current, and an actual bus voltage, respectively;
a first input of the first control module is connected to a target voltage, and a second input of the first control module is connected to the sampling correction module for comparing the bus correction voltage with the target voltage and outputting a voltage adjustment coefficient;
a first input of the data processing module is connected to the first control module, and a second input of the data processing module is connected to the sampling correction module for obtaining a reference current according to the utility correction voltage and the voltage adjustment coefficient;
a first input of the second control module is connected to the data processing module, and a second input of the second control module is connected to the sampling correction module for outputting a target control signal to the main switch tube according to the reference current and the inductor correction current.

15. The APFC control system according to claim 14, wherein the zero-pole compensation module is specifically configured to perform:
obtaining a delay angle, the utility voltage, the inductor current, and the bus voltage; and
performing zero-pole compensation on the utility voltage, the inductor current, and the bus voltage according to the delay angle to obtain a utility compensation voltage, an inductor compensation current, and a bus compensation voltage, respectively.

16. The APFC control system according to claim 15, wherein the APFC control circuit further comprises:
a zero-value assignment module, connected to the zero-pole compensation module for assigning zero points to the utility compensation voltage, the inductor compensation current, and the bus compensation voltage.

17. The APFC control system according to claim 14, wherein the sampling correction module comprises: a sampling unit and a filtering correction unit;
the sampling unit is connected to the utility power and the boost module for sampling the utility voltage, the inductor current, and the bus voltage;
the filtering correction unit is connected to the sampling unit for filtering and correcting the utility voltage, the inductor current, and the bus voltage to obtain the utility correction voltage, the inductor correction current, and the bus correction voltage, respectively.

18. The APFC control system according to claim 17, wherein the sampling unit comprises: a first sampling subunit, a second sampling subunit, and a third sampling subunit;
the first sampling subunit is connected to the boost module for sampling the bus voltage of the boost module;
the second sampling subunit is connected to the utility power for sampling the utility voltage of the utility power;
the third sampling subunit is connected to the boost module for sampling the inductor current of the boost module.

19. The APFC control system according to claim 18, wherein the filtering correction unit comprises: a first filtering correction subunit, a second filtering correction subunit, and a third filtering correction subunit;
the first filtering correction subunit is connected to the first sampling subunit for filtering and correcting the bus voltage to obtain the bus correction voltage;
the second filtering correction subunit is connected to the second sampling subunit for filtering and correcting the utility voltage to obtain the utility correction voltage;
the third filtering correction subunit is connected to the third extraction unit for filtering and correcting the inductor current to obtain the inductor correction current.

20. The APFC control system according to claim 19, wherein the APFC control circuit further comprises:
a timing control module, connected to the start-up current limiting module for controlling the start-up current limiting module to short circuit in response to the bus voltage being greater than a preset voltage.

\* \* \* \* \*